US010586034B2

(12) United States Patent
Nishida

(10) Patent No.: US 10,586,034 B2
(45) Date of Patent: Mar. 10, 2020

(54) NETWORK COMMUNICATION METHOD AND NETWORK COMMUNICATION SYSTEM

(71) Applicants: SecureBrain Corporation, Tokyo (JP); Hitachi Systems, Ltd., Tokyo (JP)

(72) Inventor: Masata Nishida, Tokyo (JP)

(73) Assignee: SecureBrain Corporation, Tokyo (JP)

( * ) Notice: Subject to any disclaimer, the term of this patent is extended or adjusted under 35 U.S.C. 154(b) by 214 days.

(21) Appl. No.: 15/563,508

(22) PCT Filed: Mar. 29, 2016

(86) PCT No.: PCT/JP2016/060031
§ 371 (c)(1),
(2) Date: Sep. 29, 2017

(87) PCT Pub. No.: WO2016/158908
PCT Pub. Date: Oct. 6, 2016

(65) Prior Publication Data
US 2018/0096129 A1    Apr. 5, 2018

(30) Foreign Application Priority Data
Mar. 30, 2015   (JP) ................................ 2015-069899

(51) Int. Cl.
*H04L 9/00*    (2006.01)
*G06F 21/44*    (2013.01)
(Continued)

(52) U.S. Cl.
CPC .............. *G06F 21/44* (2013.01); *G06F 9/547* (2013.01); *G06F 13/00* (2013.01); *H04L 67/10* (2013.01);
(Continued)

(58) Field of Classification Search
CPC ....................................................... G06F 21/44
See application file for complete search history.

(56) References Cited

U.S. PATENT DOCUMENTS

2010/0311397 A1*   12/2010   Li ........................... G06Q 20/32
                                                                                          455/414.1
2013/0246801 A1*   9/2013   Takahashi ............. H04L 9/3297
                                                                                          713/178
2015/0089228 A1*   3/2015   Kim .................... H04L 63/0876
                                                                                          713/170

FOREIGN PATENT DOCUMENTS

JP         2007-124055 A      5/2007
JP         2006-158608 A2     7/2008
(Continued)

*Primary Examiner* — Josnel Jeudy
(74) *Attorney, Agent, or Firm* — Davis, Malm & D'Agostine, P.C.; Richard L. Sampson

(57) ABSTRACT

[Objective] To provide a technique for allowing, in a network communication system consisting of a first server for sending contents to a client and a second server for executing an application upon being called from the client, the first server to appropriately detect that the second server is called. [Solution Means] In a communication method in a network communication system composed of a first server, a second server, and a client, when predetermined contents are sent to the client from the first server, API information for executing an application program of the second server is included in the contents, and the application is executed on the second server by an API call from the client. During this, the second server generates execution certification information on the basis of dynamic common information that changes dynamically, and sends to the client the execution certification information along with the application execution result. The client sends the execution certification information to the first server, and the first server detects the execution of the application program on the second server.

26 Claims, 7 Drawing Sheets

(51) Int. Cl.
    *G06F 13/00*     (2006.01)
    *H04M 7/00*     (2006.01)
    *G06F 9/54*     (2006.01)
    *H04L 29/08*     (2006.01)
    *H04L 29/06*     (2006.01)

(52) U.S. Cl.
    CPC ...... *H04L 67/2814* (2013.01); *H04L 67/2819* (2013.01); *H04M 7/0012* (2013.01); *H04L 67/40* (2013.01)

(56) References Cited

FOREIGN PATENT DOCUMENTS

| | | |
|---|---|---|
| JP | 2008-158608 A | 7/2008 |
| JP | 2009-15750 A | 1/2009 |
| JP | 2009-205263 A | 9/2009 |
| JP | 2010-218212 A | 9/2010 |
| JP | 4913002 B2 | 4/2012 |
| JP | 4942101 B2 | 5/2012 |
| JP | 2013-191962 A | 9/2013 |
| JP | 2015-41331 A | 3/2015 |
| JP | 2016-060031 | 6/2016 |

\* cited by examiner

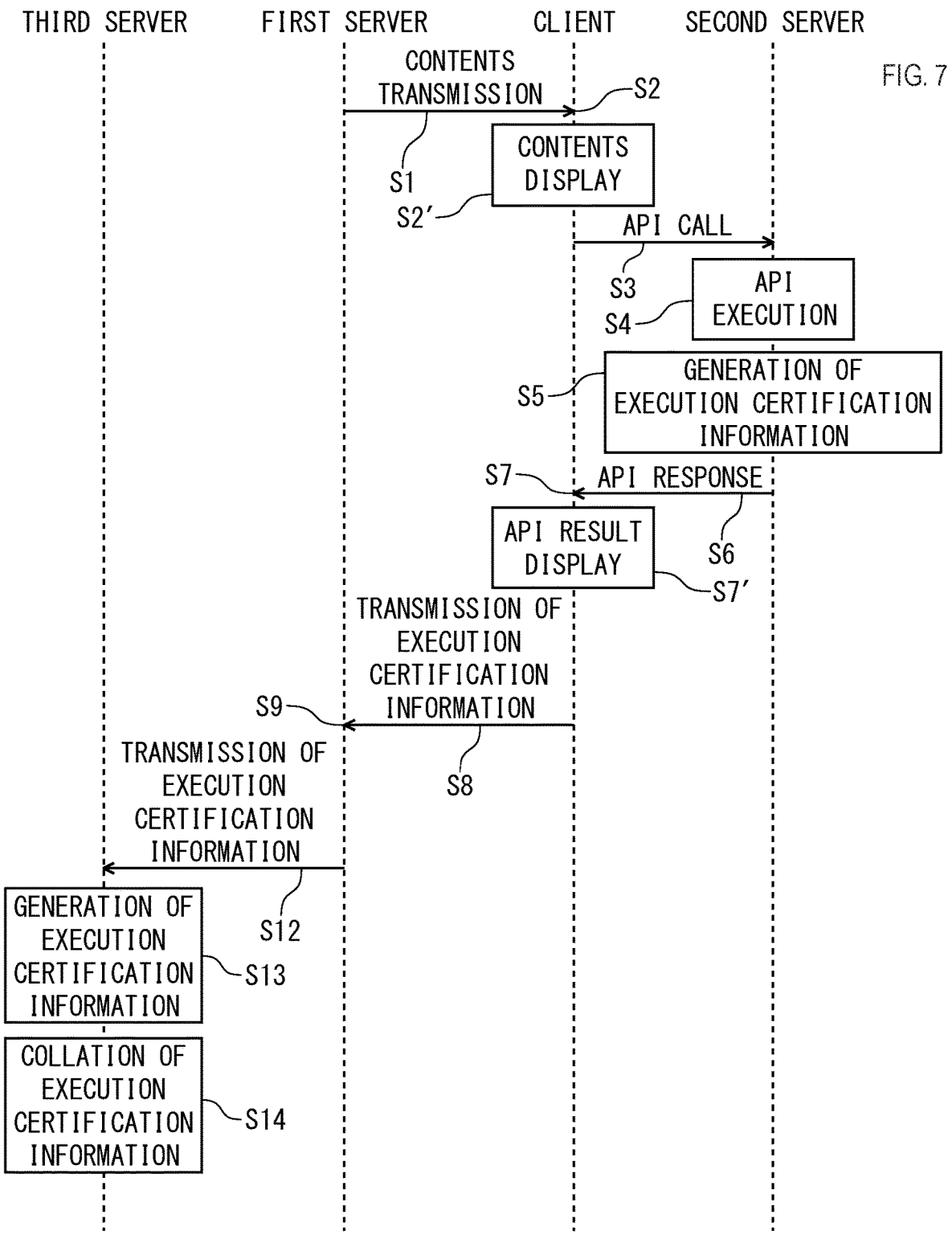

NETWORK COMMUNICATION METHOD AND NETWORK COMMUNICATION SYSTEM

TECHNICAL FIELD

The present invention relates to a network communication method and a network communication system. In particular, the invention relates to a communication technique that can be used to detect that an application is executed between a first server for sending contents and a second server for executing the application.

BACKGROUND ART

Among various services provided using the Internet, an external reference-type API (application programming interface) service has been known by which, when a client accesses a web server, the contents thereof include a code to call an API server and an application referred to in the API server is executed to return the result to the client.

According to a specific example thereof, in the case of the API of Google Maps®, a code for displaying a map is embedded in web contents to thereby allow a client web browser to display web contents and map contents can be displayed that are a result of the return from the API service.

Such an API service has been widely used and has been used also for a service requiring high security such as the Internet banking system.

As described above, returning the execution result from the API server to the client is of course a general processing. However, it is not generally carried out to determine at the web server side whether or not the client has correctly called the API server and has received the result. This is presumably due to that the necessity of allowing the web server side to recognize the use of a conventional API service has not been recognized and that detecting the use while excluding masquerades has been difficult.

Related patent publications include Patent Publication 1 that discloses that a Web system is provided by which, even under an environment in which the direct control from the Web system to an instruction target system cannot be achieved, the client does not need an instruction target system application and a data transfer operation from the instruction target system is also easily performed. To realize this, the Web system includes: a function of allowing a Web server to receive specified information specifying an instruction target system from a client Web browser; a reception means including a function of receiving a processing request from the Web browser; an acquisition means of acquiring contents data corresponding to the processing request from a contents data storage section; an editing means of editing the contents data as contents data including a processing instruction to send a processing instruction corresponding to the processing request to the instruction target system specified by the specified information; and a transmission means of sending the contents data to the Web browser.

The above Patent Publication 1 also fails to provide a technique to send some result from the instruction target system to the Web server.

Patent Publication 2 discloses service monitoring system and method for avoiding a problem that the procedure for a service component cannot be completed in the middle of a web service system in which a plurality of web component servers or service components cooperate one another. To realize this, a technique is provided for example by which a web service monitoring server periodically monitors a web component server to update, when the monitoring result shows a problem, a service execution server so that no execution request is transferred to a stopped service component. A service state storage server is updated so that the server cannot be searched by a search engine or an alarm notification is sent to a stopped service component provider.

Patent Publication 2 provides a technique to monitor the web component. However, this technique is similar to that of Patent Publication 1 in that the web component server is not notified.

Patent Publication 3 discloses a technique to notify when a Web application error is detected, an administrator of the error. To realize this, a program for analyzing, monitoring, and detecting the state of the Web application is configured to include three function sections of a packet acquisition function section, a packet analysis function section, and an analysis result notification function section. The packet acquisition function section acquires a packet that is sent from a Web application of a Web server machine to a Web browser of a Web client machine. The packet analysis function section determines whether or not the acquired packet includes a specific character string, an error status code, and an error message to send, when the packet includes them, the analysis result to an analysis result notification function section. The analysis result notification function section prepares an electronic mail to which the received analysis result is notified based on sender mail address information and destination mail address information set in advance and the received analysis result to send the electronic mail to a mail server.

This Patent Publication 3 discloses the technique to remotely monitor the Web application. However, this technique is to monitor a packet in a Web server to detect an error of the Web application to notify the error by a mail and is not originally intended to be applied to the API service as described above.

According to Patent Publication 4 by the inventor or the like of this case, a technique is provided by which a web server is allowed to include an authorization file set to confirm the server authenticity so that an authorization file calculated in advance based on an algorithm provided in the client is compared with an authorization file received from the web server to determine whether the former matches with the latter to thereby prevent the server from being masqueraded. However, this technique is also not applied to a system using two or more servers.

PRIOR ART PUBLICATION

Patent Publication

Patent Publication 1: Japanese Unexamined Patent Application No. 2010-218212
Patent Publication 2: Japanese Patent No. 4913002
Patent Publication 3: Japanese Unexamined Patent Application No. 2009-205263
Patent Publication 4: Japanese Patent No. 4942101

SUMMARY OF THE INVENTION

Problem to be Solved by the Invention

The present invention has been made in view of the problem of the above prior art. It is an objective of the invention to provide a technique for allowing, in a network communication system consisting of a first server for sending contents to a client and a second server for executing an application upon being called from the client, the first server can appropriately detect that the second server is called.

Means for Solving the Problem

In order to solve the above problem, the present invention provides a network communication method as described below. According to the invention according to claim 1, provided is a communication method in a network communication system composed of a first server, a second server, and a client connected via a network.

The method is characterized in including:
(S1) a contents transmission step of allowing a contents transmission means of the first server to send to a client predetermined contents including at least API information for executing a predetermined application program stored in the second server;
(S2) a contents reception step of allowing a contents reception means of the client to receive the contents;
(S3) an API call step of allowing an API call means of the client to call the second server based on the API information;
(S4) an application execution step of allowing an application execution means of the second server to execute, depending on the call, the application program stored in the second storage means;
(S5) an execution certification information generation step of allowing an execution certification information generation means of the second server to generate execution certification information based on dynamically-changing dynamic common information;
(S6) an API response step of allowing an API response means of the second server to send the API execution result of the application execution means and the execution certification information to the client;
(S7) an API execution result reception step for allowing the contents reception means of the client to receive the API execution result and the execution certification information;
(S8) an execution certification information transmission step of allowing the execution certification information transmission means of the client to send at least the execution certification information to the first server;
(S9) an execution certification information reception step of allowing the execution certification information reception means of the first server to receive at least the execution certification information from the client; and
(S10) an API execution detection step of allowing the API execution detection means of the first server to detect, based on the execution certification information, the execution of the application program by the application execution means of the second server in association with the contents transmission by the contents transmission means.

According to the invention according to claim 2, a communication method is provided according to which the above dynamic common information is the time or a time factor changing with the time elapsed from a predetermined starting point.

According to the invention according to claim 3, a communication method is provided according to which, the dynamic common information is information received from an external device via the network or information calculated by a predetermined computation based on the information.

According to the invention according to claim 4, a communication method is provided according to which, in the above communication method, the API execution detection means of the first server generates execution certification information based on the dynamic common information to collate the execution certification information with the execution certification information received by the execution certification information reception means of the first server.

According to the invention according to claim 5, a communication method is provided according to which, in the above communication method includes, in a configuration in which the network communication system includes a third server connected to the above network communication system via a network, a step of allowing the API execution detection means of the first server to send to the third server the execution certification information received by the execution certification information reception means and a step of allowing the execution certification information collation means of the third server to generate execution certification information based on the dynamic common information to collate the execution certification information with the execution certification information received from the first server.

According to the invention according to claim 6, a communication method is provided according to which the execution certification information generation means of the second server uses the above dynamic common information to generate execution certification information based on a predetermined formula provided in advance.

According to the invention according to claim 7, a communication method is provided according to which, the second server includes an execution certification information database in which the dynamic common information is associated in advance with the execution certification information. The execution certification information generation means of the second server refers to the execution certification information database based on the dynamic common information during the processing to generate the execution certification information.

According to the invention according to claim 8, the communication method according to any of claims 1 to 7 is provided according to which, the contents transmission means of the first server sends the contents further added with predetermined additional information. The API call means of the client sends the additional information when calling the second server. The execution certification information generation means of the second server generates the execution certification information based on the additional information together with the dynamic common information.

According to the invention according to claim 9, the API execution detection means of the first server can generate the execution certification information based on the additional information together with the dynamic common information to collate the execution certification information with the execution certification information received by the execution certification information reception means of the first server.

According to the invention according to claim 10, the execution certification information collation means of the third server can generate the execution certification information based on the additional information together with the dynamic common information to collate the execution certification information with the execution certification information received from the first server.

According to the invention according to claim 11, the additional information may be a random value generated by a random number generation means provided in the first server.

According to the invention according to claim 12, the additional information may be an identification value allocated in advance to the first server.

According to the invention according to claim 13, the API information sent from the contents transmission means of the first server may include link information to the first server. The execution certification information transmission means of the client may send the execution certification information based on the link information.

According to the invention according to claim 14, a network communication system can be provided that is composed of the first server, the second server, and the client connected via a network. The first server includes a contents transmission means of the first server to send predetermined contents to the client so that the predetermined contents include at least API information for executing a predetermined application program stored in the second server; an execution certification information reception means of receiving at least execution certification information from the client; and an API execution detection means of detecting, based on the execution certification information, the execution of the application program by the application execution means of the second server while being associated with the contents transmission by the contents transmission means.

The client includes a contents reception means of receiving contents from the first server and receiving the API execution result and the execution certification information from the second server; an API call means of calling the second server based on the API information received from the first server; and an execution certification information transmission means of sending to the first server at least the execution certification information received from the second server. Furthermore, the second server includes an application execution means of executing the application program stored in the second storage means depending on the call; an execution certification information generation means of generating execution certification information based on dynamically-changing dynamic common information; and an API response means of sending, to the client, the API execution result of the application execution means and the execution certification information.

According to the invention according to claim 15, a network communication system is provided in which the dynamic common information is the time or a time factor changing with the time elapsed from a predetermined starting point.

According to the invention according to claim 16, a network communication system is provided in which the dynamic common information is information received from an external device via the network or information calculated by a predetermined computation based on the information.

According to the invention according to claim 17, in the above network communication system, the API execution detection means of the first server may generate execution certification information based on the dynamic common information to collate the execution certification information with the execution certification information received by the execution certification information reception means of the first server.

According to the invention according to claim 18, in the above network communication system, the network communication system may include a third server connected via a network and the API execution detection means of the first server sends, to the third server, execution certification information received by the execution certification information reception means, and the third server includes an execution certification information collation means of generating execution certification information based on the dynamic common information to collate the execution certification information with the execution certification information received from the first server.

According to the invention according to claim 19, the execution certification information generation means of the second server also can use the dynamic common information to generate execution certification information based on a predetermined formula provided in advance.

According to the invention according to claim 20, the second server also can include an execution certification information database in which the dynamic common information is associated in advance with the execution certification information and the execution certification information generation means of the second server refers to the execution certification information database based on the dynamic common information during the processing to generate the execution certification information.

According to the invention according to claim 21, in the above network communication system, the contents transmission means of the first server also can send the contents further added with predetermined additional information, the API call means of the client sends the additional information when calling the second server, and the execution certification information generation means of the second server generates the execution certification information based on the additional information together with the dynamic common information.

According to the invention according to claim 22, the API execution detection means of the first server also may generate the execution certification information based on the additional information together with the dynamic common information to collate the execution certification information with the execution certification information received by the execution certification information reception means of the first server.

According to the invention according to claim 23, the execution certification information collation means of the third server also can generate the execution certification information based on the additional information together with the dynamic common information to collate the execution certification information with the execution certification information received from the first server.

According to the invention according to claim 24, the additional information also may be a random value generated by a random number generation means provided in the first server.

According to the invention according to claim 25, the additional information also may be an identification value allocated in advance to the first server.

According to the invention according to claim 26, the API information sent from the contents transmission means of the first server includes link information to the first server, and the execution certification information transmission means of the client also can send the execution certification information based on the link information.

According to the invention according to claim 27, a first server is provided that is used in the network communication system according to any one of claims 14 to 26.

According to the invention according to claim 28, a second server is provided that is used in the network communication system according to any one of claims 14 to 26.

According to the invention according to claim 29, a third server is provided that is used in the network communication system according to claim 18 or 23.

EFFECT OF INVENTION

According to the above configuration, the present invention allows, in a network communication system consisting of a first server for sending contents to a client and a second server for executing an application upon being called from the client, the first server to detect that the second server is called. In particular, the first server, the third server, and the second server can generate and collate execution certification information based on dynamic common information. Thus, the masquerade can be prevented to contribute to highly-accurate detection.

BRIEF DESCRIPTION OF DRAWINGS

FIG. 7 is a flowchart (Example 2) in the network communication method of the present invention.

EMBODIMENT FOR CARRYING OUT THE INVENTION

Figure 1:
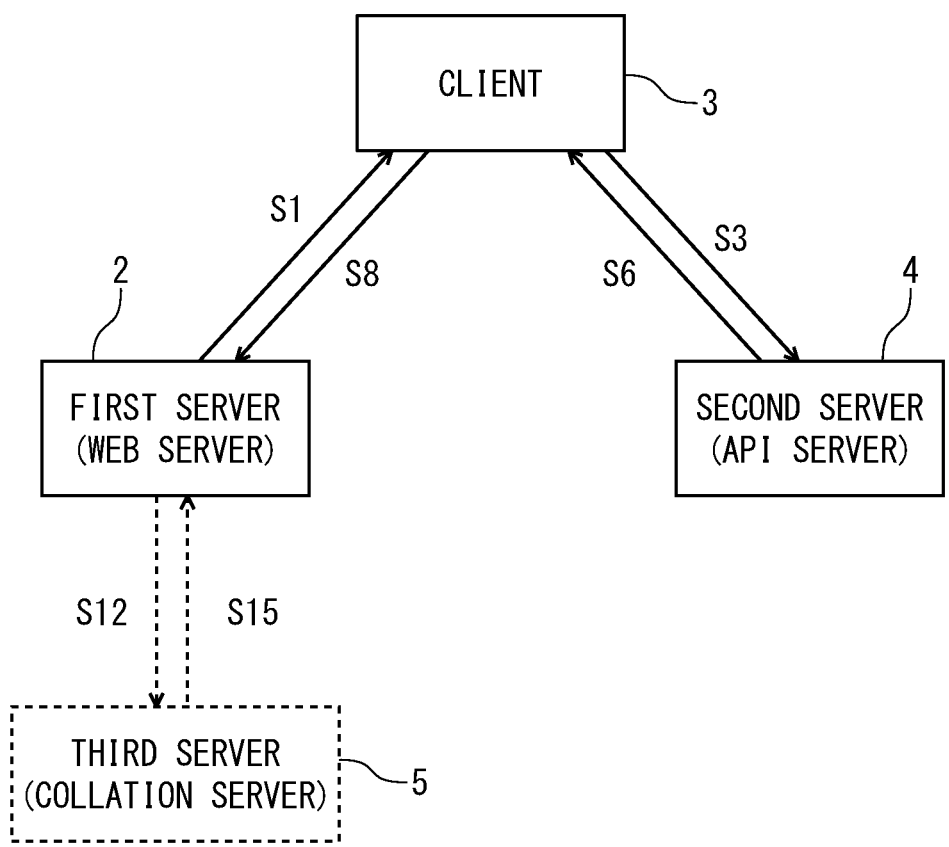
FIG. 1 is a general view illustrating a network communication system in the present invention.

The following section will describe an embodiment of the present invention using the drawings. The present invention is not limited to the following examples and can be appropriately carried out within the scope of the claims. FIG. 1 is a general view illustrating a network communication system (1) in the present invention. This system can be applied to services used on the Internet and the external reference-type API service in particular.

In particular, the invention is applied to systems providing services requiring high security such as known Internet banking and online security system to thereby appropriately detect that the client accesses the respective servers constituting the system, contributing to improved security.

EXAMPLE 1

This system (1) is composed of the first server (web server) (2) connected to a network such as the Internet, a client (3), and the second server (API server) (4). As described later, Example 2 further includes the third server (collation server) (5). In this specification, the web server (2) will be described as an example of the first server, the API server (4) will be described as an example of the second server, and the collation server (5) will be described as an example of the third server. However, in the execution of the present invention, the first server is not always limited to the web server and also can be any server so long as the server can send contents to the client. The second server is not limited to a known API server and also may be any server so long as the server executes an application called by the client. For convenience, the third server is called as a collation server but also may be any server having other functions so long as the server has at least a function to collate the execution certification information according to the present invention.

Figure 2:
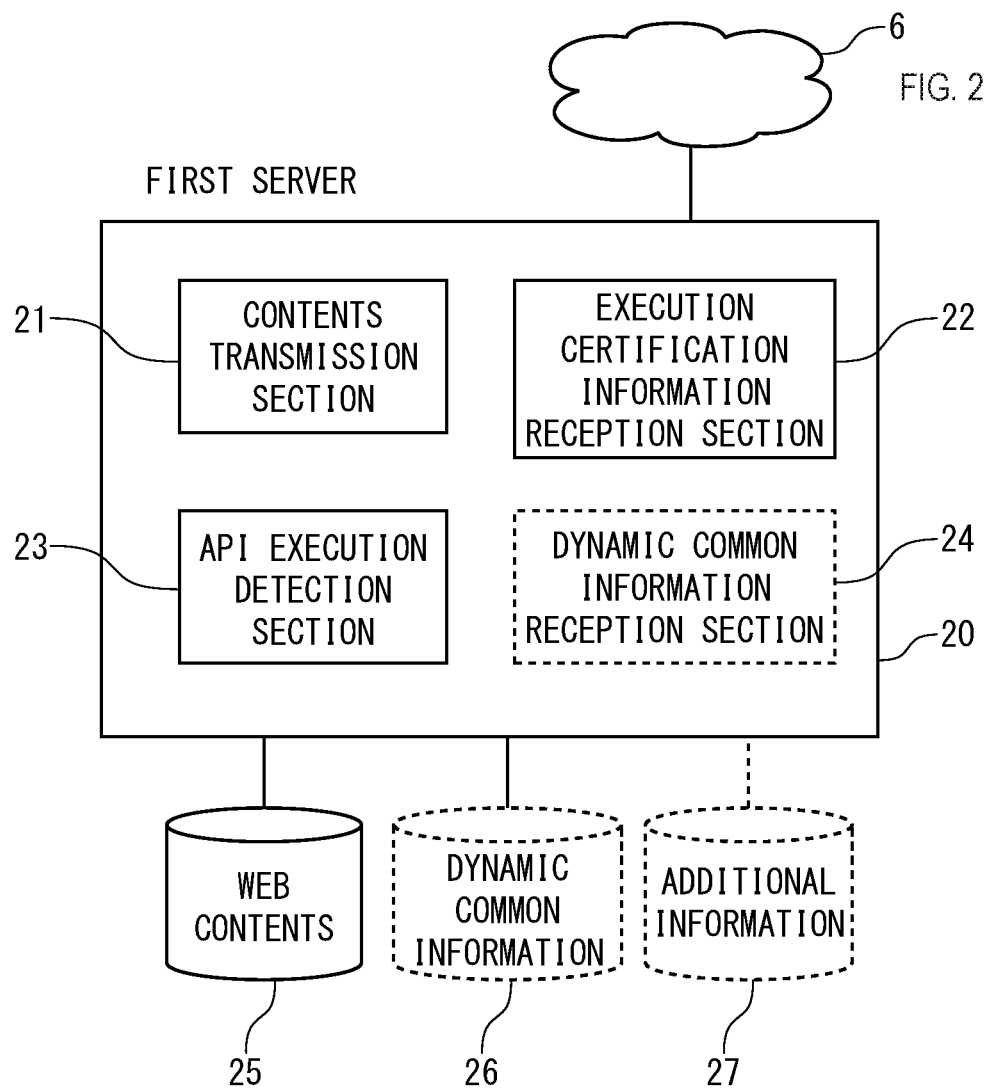
FIG. 2 is a block diagram illustrating the first server according to the present invention.

FIG. 2 is a block diagram illustrating the web server (2) according to the present invention. The web server (2) is a known server apparatus using a computer and includes a contents transmission section (21), an execution certification information reception section (22), and an API execution detection section (23) realized by computer programs in the CPU (30). The web server (2) also includes a storage section provided by a hard disk or memory to store web contents (25). In addition, the web server (2) includes a network interface to communicate with the Internet (6) and other well-known configurations, which will not be described further.

Figure 3:
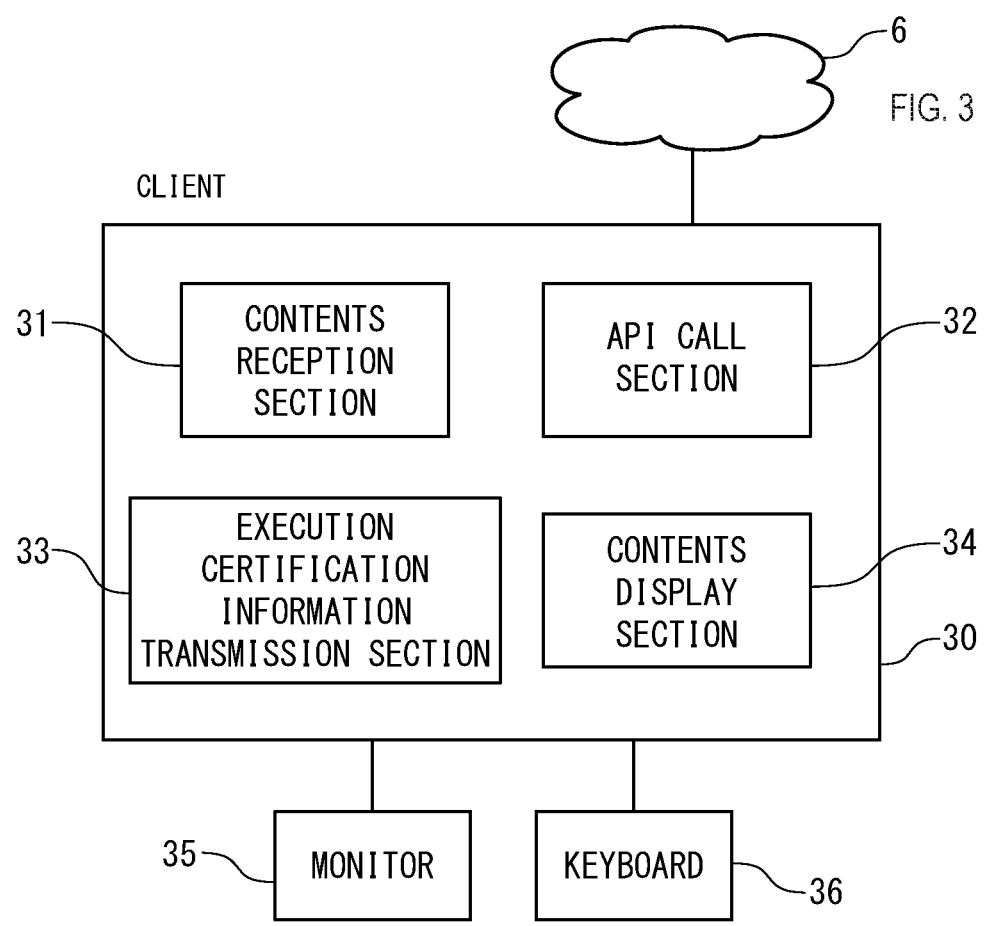
FIG. 3 is a block diagram illustrating a client according to the present invention.

FIG. 3 is a block diagram illustrating the client (3) according to the present invention. The client (3) is also a known terminal apparatus using a computer and includes a contents reception section (31), an API call section (32), an execution certification information transmission section (33), and a contents display section (34) realized by computer programs in the CPU (30). The client (3) is connected to a monitor (35) to display contents on a screen and an input apparatus such as a keyboard (36). The client (3) also includes a network interface to communicate with the Internet (6) and other well-known configurations, which will not be described further.

Figure 4:
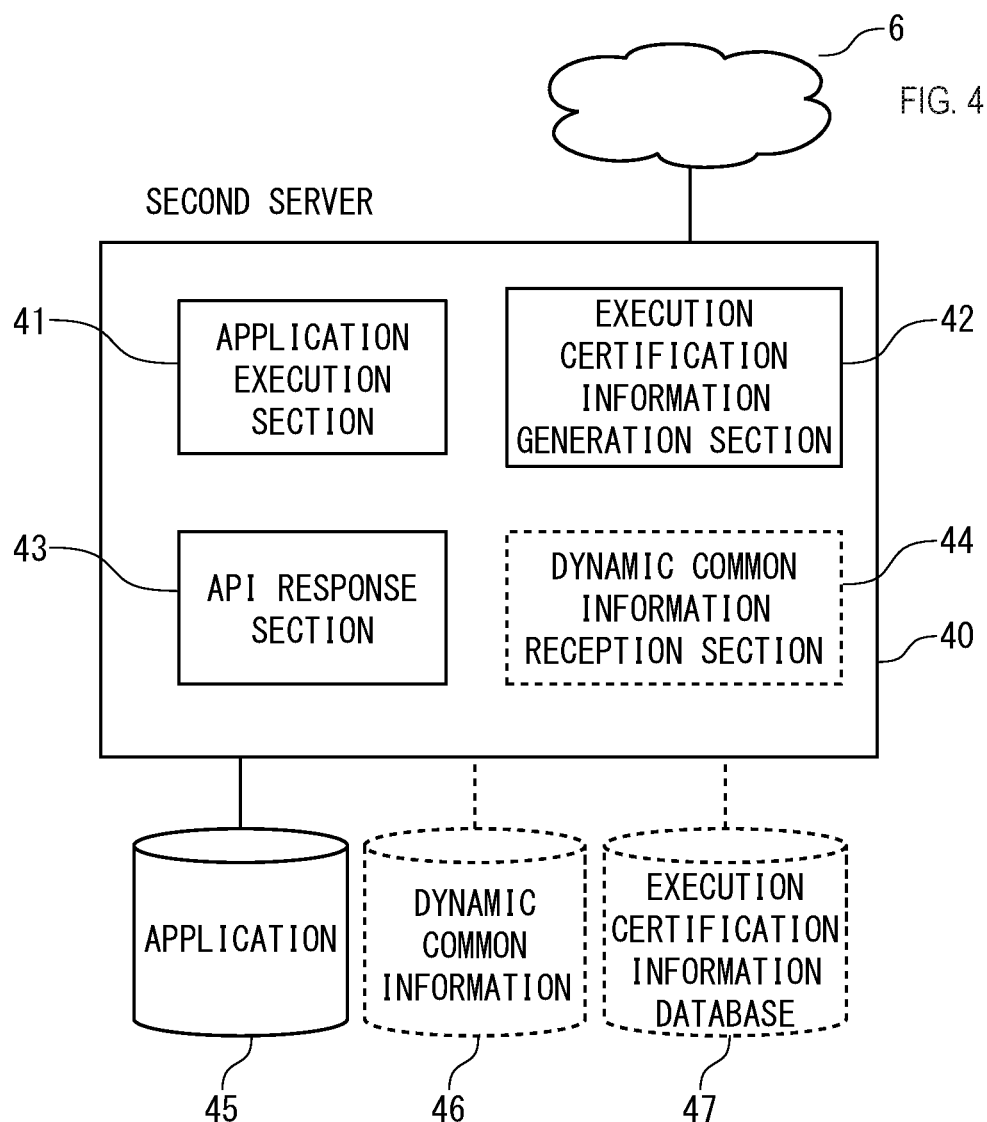
FIG. 4 is a block diagram illustrating the second server according to the present invention.

FIG. 4 is a block diagram illustrating the API server (4) according to the present invention. The API server (4) is also a known server apparatus and includes an application execution section (41), an execution certification information generation section (42), and an API response section (43) realized by computer programs in the CPU (40). The API server (4) also includes a storage section provided by a hard disk or memory to store a to-be-executed application (45). The API server (4) also includes a network interface to communicate with the Internet (6) and other well-known configurations, which will not be described further.

Figure 6:
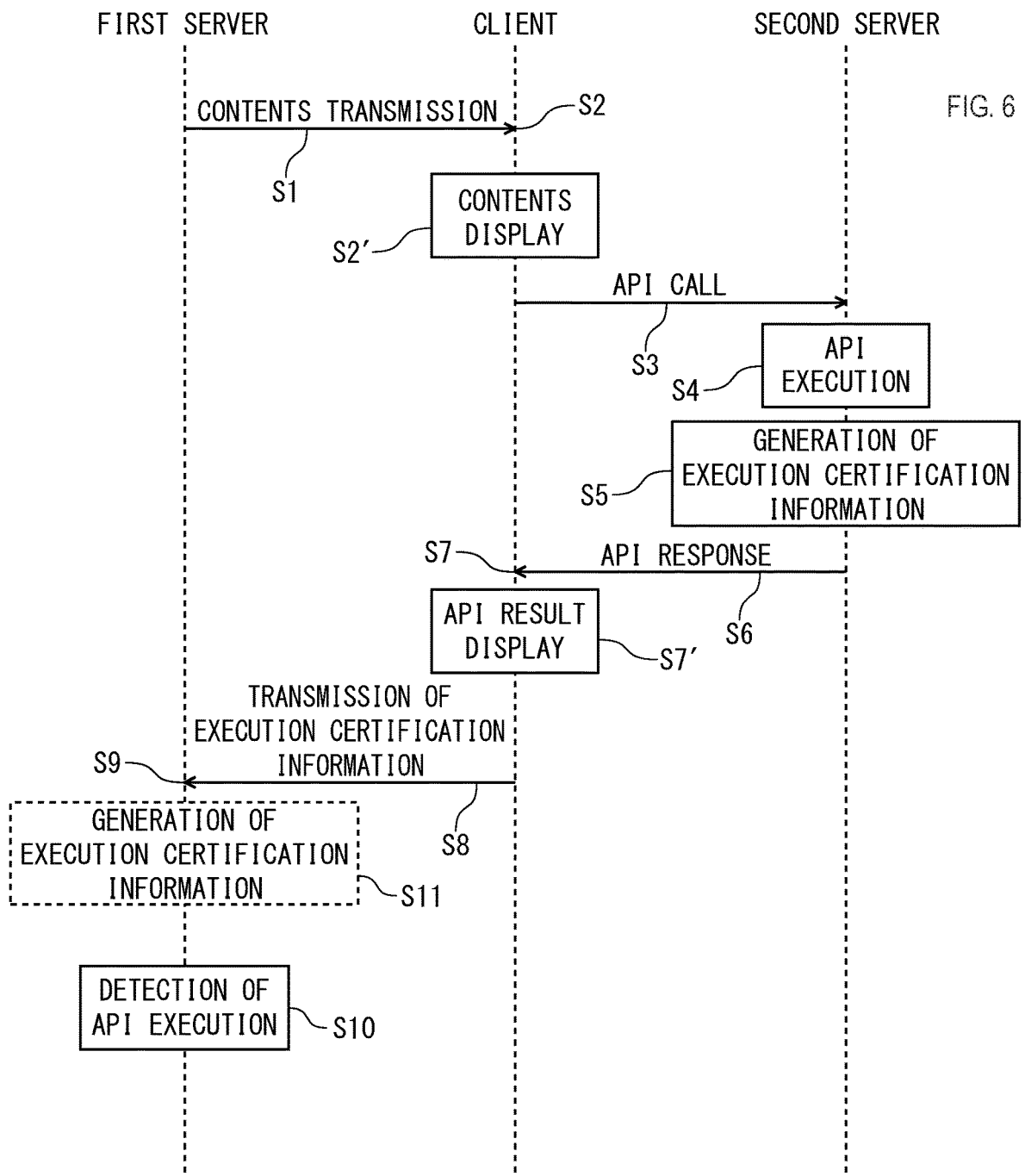
FIG. 6 is a flowchart (Example 1) in the network communication method of the present invention.

FIG. 6 is a flowchart (Example 1) illustrating the network communication method of the present invention.

The present invention provides a communication method in a network communication system composed of the web server (2), the API server (4), and the client (3) connected via a network.

First, the contents transmission section (21) of the web server (2) sends to the client (3) predetermined contents including at least API information to execute a predetermined application program stored in the API server (4) (contents transmission step: S1). The API information is described by JavaScript® for example and can be referred to by being embedded in HTML as contents or by being externally read through the HTML.

As is well-known, the contents reception section (31) of the client (3) receives the contents (contents reception step: S2) to allow the contents display section (34) to execute a web browser for example, thereby performing contents display (S2'). During this, the API call section (32), which also can be provided as a function of the web browser, calls the API server (4) based on JavaScript (API call step: S3).

Next, the application execution section (41) of the API server (4) reads, depending on the call, the application (45) stored in the storage section to execute the application (API execution step (S4)). The processings so far are the similar to those conventionally carried out in the external reference-type API service. In other words, the present invention can be easily implemented by being added to an existing API service.

Next, the execution certification information generation section (42) of the API server (4) according to the present invention generates execution certification information based on dynamically-changing dynamic common information (execution certification information generation step: S5).

The dynamic common information means information that is shared among the API server (4) and the respective communication apparatuses on the network such as the web server (1) and that is dynamically-changing. The term "common" means that the information can be shared among the respective communication apparatuses but is not limited to a case where the information is shared through the communication on the network and also can be acquired independently of an external phenomenon.

The term "dynamically-changing" means that the information is different at least at a different time and that the information changes by an arbitrary trigger or interval. Such information is not limited to information directly processed by a computation means such as a numerical value, a character string, or a key used for encryption or decryption and also may be a computer program or a database for example.

The simplest example of the dynamic common information is a time that can be easily acquired by a clock included in each server in an independent manner. The time also can be adjusted by being periodically acquired from a known NTP (Network Time Protocol) server. The time elapsed from a predetermined starting point that is synchronized among the respective servers also can be used as the dynamic common information. Based on the time elapsed from the predetermined starting point, a result calculated based on a predetermined algorithm shared among the respective servers also can be used as the dynamic common information. According to the present invention, the time or a time factor changing with the time elapsed from a predetermined starting point as described above can be used as the dynamic common information.

Other examples of the dynamic common information include information received from an external device via the network or information calculated by a predetermined computation based on the information. For example, a server apparatus for distributing dynamic common information as an external device can be provided, wherein the server apparatus can send the dynamic common information in a form different depending on a predetermined trigger (e.g., in a cyclic manner or when an inquiry from the second server is received).

This network is not limited to the above network (6) connected to the web server (2), the client (3), and the API server (4) and also may be another communication network by which at least the first server or the third server and the second server according to the present invention can acquire information. The network also may have another configuration in which the information is distributed through broadcasting.

Specifically, as shown in FIG. 4, the storage section may store an algorithm as the dynamic common information (46) to calculate the above time factor. Alternatively, arranged information may be included as the dynamic common information (46) so that information sequentially extracted in accordance with a time or an elapsed time can be used as the dynamic common information at the time.

Another configuration also may be used in which the CPU (40) includes a dynamic common information reception section (44) to receive the dynamic common information from an external device for example.

As described above, when the information changes due to time passage or changes cyclically, some timing for generating the execution certification information may cause a case where completely-common information cannot be used. However, the present invention can use a predetermined number of pieces of the dynamic common information to thereby flexibly cope with a delay in the network communication.

A processing in which the execution certification information generation section (42) uses the dynamic common information to generate the execution certification information can be done by various methods. Firstly, the storage section of the API server (4) stores an authorization file set as the execution certification information database (47). Then, the execution certification information generation section reads an algorithm (program) similarly stored in advance in the storage section to use the dynamic common information at the time also as a parameter to thereby select a specific authorization file. Specifically, a different file is selected as this authorization file depending on a change of the dynamic common information. The authorization file set used here may have a configuration similar to that disclosed by the inventor of this case in Patent Publication 4 for example.

Secondly, the authorization file also may be substituted with a value calculated based on a predetermined algorithm that is used as the execution certification information. Thirdly, a comparative list of the execution certification information corresponding to the dynamic common information may be provided as the execution certification information database (47). Then, the execution certification information generation section (42) may extract, based on the dynamic common information during the extraction, specific execution certification information from the execution certification information database (47).

Fourthly, another method also may be used in which the above predetermined algorithm encrypts the dynamic common information using a secret key in a key exchange method and the encryption result is used as the execution certification information.

The API response section (43) of the API server (4) sends the API execution result of the application execution section (41) and the execution certification information to the client (3) (API response step: S6). Then, the contents reception section (31) of the client (3) receives the API execution result and the execution certification information (API execution result reception step: S7).

As is known, when the API server (4) is called, the execution result thereof is generally displayed on a web browser for example. Thus, this example also shows an example in which the contents display section (34) displays the execution result on the monitor (35) (S7'). Of course, no display is required depending on the details of the API service.

In the present invention, the execution certification information transmission section (33) of the client (3) sends at least the execution certification information to the web server (2) (execution certification information transmission step: S8). Then, the execution certification information reception section (22) of the web server (2) receives at least the execution certification information from the client (3) (execution certification information reception step: S9).

Finally, the API execution detection section (23) of the web server (2) detects, based on the execution certification information, the execution of the application program by the application execution section (41) of the API server (4) while being associated with the transmission of the contents by the contents transmission section (21) (API execution detection step: S10).

After the detection of the API execution, an arbitrary processing can be performed such as the storage of the detection result in the storage section, the return of the detection result depending on the reference from the client (3), or a changed response to the request from the next client depending on the detection result for example. In the execution of the present invention, the minimum requirement is that the dynamic common information is used as the execution certification information. This consequently allows the detection result to be examined immediately or in the future.

By the configuration described above, the API execution in the API server (4) can be appropriately detected by the web server (2) based on the execution certification information, which has been not achieved by the conventional network communication system.

Next, an example will be described in which the API execution detection section (23) in the web server (2) generates the execution certification information based on the dynamic common information (S11) to collate the execution certification information with the execution certification information received by the execution certification information reception section (22).

In this case, the web server (2) includes a configuration similar to that of the above API server (4) in order to use the dynamic common information. Specifically, the time shown by the clock of the web server (2) or a time factor such as the elapsed time from a predetermined trigger synchronized in advance with the API server (4) as a starting point can be used as the dynamic common information. As shown in FIG. 2, another configuration also may be used in which the storage section stores an algorithm for example as the dynamic common information (26) to calculate the time factor. The information arranged in the storage section also may be provided as the dynamic common information (26) so that information sequentially extracted based on the time or the elapsed time is used as the dynamic common information at the time. Another configuration also may be used in which the CPU (20) includes a dynamic common information reception section (24) to receive the dynamic common information from an external device for example.

Then, the API execution detection section (23) uses the dynamic common information to generate the execution certification information. Here, the same processing as that of the execution certification information generation section (42) of the API server (4) can be used to generate the execution certification information for collation. Specifically, in the configuration in which the first method is used to select a specific authorization file from the authorization file set, a similar authorization file set is stored in the storage section of the web server (2) and an authorization file is selected. Then, the authorization file received from the API server (4) is collated with the selected authorization file to determine whether or not the former matches with the latter.

Since many authorization files are stored, when the authorization files extracted in the same opportunity match each other based on the dynamically-changing dynamic common information, the execution of the application in the API server (4) can be securely detected. In particular, when an algorithm for selecting an authorization file is shared only among the web server (2) and the API server (4), it is very difficult for a third party to masquerade the API server to send a file set to the web server (2).

According to another collation method using an authorization file set, the web server (2) may not include an algorithm and includes a comparative list of the dynamic common information and the execution certification information. Specifically, the comparative list is used to collate the authorization file extracted by the API server (4) with an authorization file extracted based on the dynamic common information at the time to determine whether or not the former matches with the latter.

Only the API server (4) includes an algorithm. Thus, a third party having no comparative list or algorithm has a difficulty in identifying an authorization file. Thus, this collation can be used to appropriately detect the execution by the API server. In this case, the web server (2) does not have to include an algorithm. Thus, it is also possible not to disclose an algorithm when administrators of the web server (2) and the API server (4) are different.

The second method in the API server (4) also may be carried out so that the API execution detection section (23) of the web server (2) uses a value calculated based on a predetermined algorithm as the execution certification information to collate this information with the received execution certification information. In this case, no algorithm may be similarly provided and a comparative list of the dynamic common information and the execution certification information may be provided.

In the case of the third method of the API server (4), the API execution detection section (23) of the web server (2) can store, in the storage section, the comparative list of the dynamic common information and the execution certification information similar to that included in the API server (4) to extract the dynamic common information during the extraction to collate these pieces of information. The web server (2) also may include an algorithm to derive the execution certification information matching with the above comparative list. In this case, a value calculated by this algorithm using the dynamic common information at the time may be used as the execution certification information to collate this information with the received execution certification information.

In the case of the fourth method in the API server (4), the API execution detection section (23) of the web server (2) may use a public key in the key exchange method to decrypt the received execution certification information. In this configuration, the decrypted dynamic common information is collated with the dynamic common information at the time to determine whether or not the former matches with the latter.

Alternatively, the API execution detection section (23) also may include a secret key shared with the API server (4). In this case, a predetermined algorithm is used to encrypt the dynamic common information at the time to collate the encrypted information with the received encrypted execution certification information to determine whether or not the former matches with the latter.

EXAMPLE 2

The following section will describe a configuration using a collation server (5) as the second example of the present invention. FIG. 7 is a flowchart in the network communication method according to Example 2. Example 2 is common to Example 1 in the contents transmission step (S1), the contents reception step (S2), the API call step (S3), the application execution step (S4), the execution certification information generation step (S5), the API response step (S6), the API execution result reception step (S7), the execution certification information transmission step (S8), the execution certification information reception step (S9), and the API execution detection step (S10), which thus will not be described further.

Figure 5:
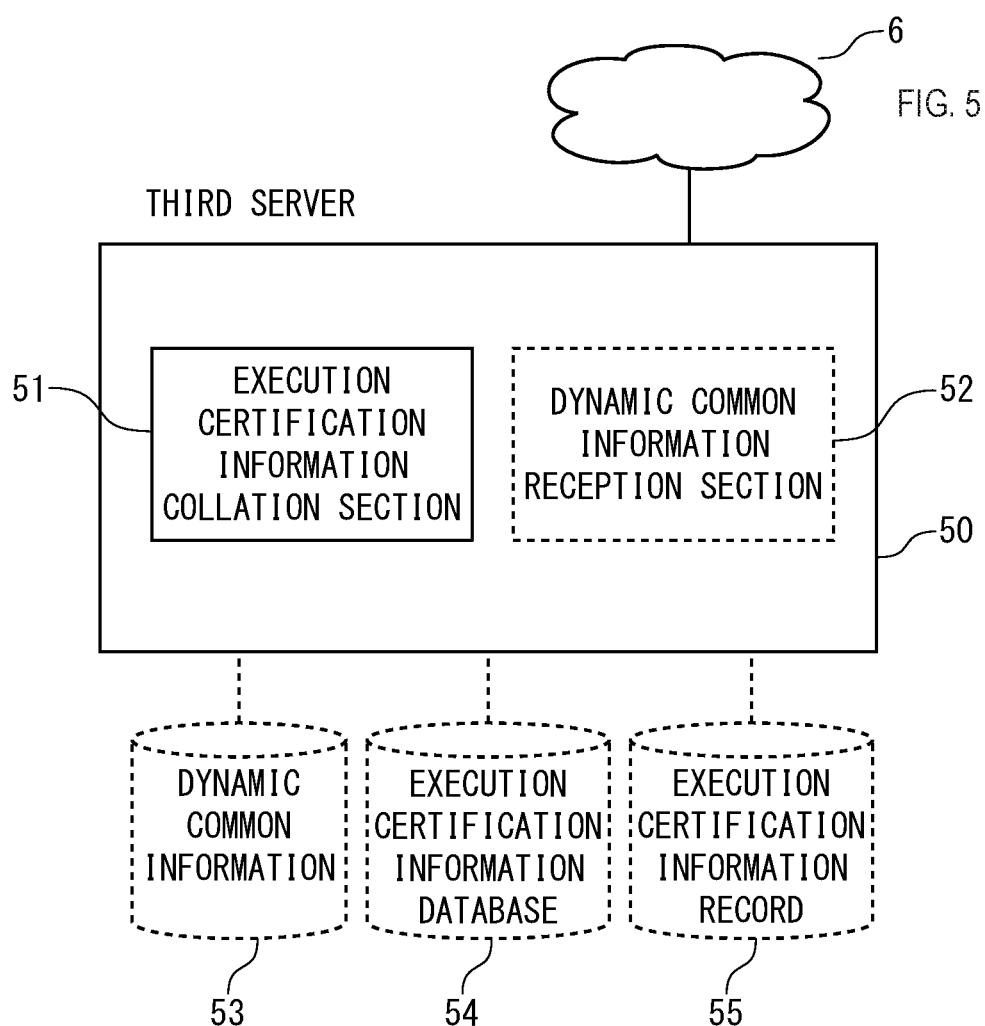
FIG. 5 is a block diagram illustrating the third server according to the present invention.

This example includes the collation server (5) shown in FIG. 5. The collation server (5) is a known server apparatus including a CPU (50). The CPU (50) can include an execution certification information collation section (51) realized by a computer program and a dynamic common information reception section (52). A storage section provided by a hard disk or a memory is provided to store dynamic common information (53), an execution certification information database (54), and an execution certification information record (55). In addition, a network interface for communicating with the Internet (6) and other well-known configurations are also provided, which will not be described further.

In this example, instead of the collation of the execution certification information by the web server (2), the collation processing is carried out by the collation server (5). Specifically, this example has a step of allowing the API execution detection section (23) of the web server (2) to send, to the collation server (5), the execution certification information received by the execution certification information reception section (S12), and a step of allowing the execution certification information collation section (51) of the collation server (5) to generate the execution certification information based on the dynamic common information (S13) to collate the execution certification information with the execution certification information received from the web server (2) (S14).

In this case, the collation server (5) also has a configuration similar to that of the API server (4) to use the dynamic common information. Specifically, the time shown by the clock of the collation server (5) or a time factor such as the elapsed time from a predetermined trigger synchronized in advance with the API server (4) as a starting point can be used as the dynamic common information. As shown in FIG. 5, another configuration also may be used in which the storage section stores an algorithm for example as the dynamic common information (53) to calculate the time factor. The information arranged in the storage section also may be provided as the dynamic common information (53) so that information sequentially extracted based on the time or the elapsed time is used as the dynamic common information at the time. Another configuration also may be used in which the CPU (50) includes the dynamic common information reception section (52) to receive the dynamic common information from an external device for example.

Then, the execution certification information collation section (51) uses the dynamic common information to generate the execution certification information. Here, the same processing as that of the execution certification information generation section (42) of the API server (4) can be used to generate the execution certification information for collation. Specifically, in the configuration in which the first method is used to select a specific authorization file from the authorization file set, a similar authorization file set is stored in the storage section of the collation server (5) and an authorization file is selected. Then, the authorization file received from the API server (4) is collated with the selected authorization file to determine whether or not the former matches with the latter.

Since many authorization files are stored, when the authorization files extracted in the same opportunity match each other based on the dynamically-changing dynamic common information, the execution of the application in the API server (4) can be securely detected. In particular, when an algorithm for selecting an authorization file is shared only among the collation server (5) and the API server (4) respectively, it is very difficult for a third party to masquerade the API server (4) or the web server (2) to send a file set to the collation server (5).

According to another collation method using an authorization file set, the collation server (5) may not include an algorithm and includes a comparative list of the dynamic common information and the execution certification information. Specifically, the comparative list is used to collate the authorization file extracted by the API server (4) with an authorization file extracted based on the dynamic common information at the time to determine whether or not the former matches with the latter.

Only the API server (4) includes an algorithm. Thus, a third party having no comparative list or algorithm has a difficulty in identifying an authorization file. Thus, this collation can be used to appropriately detect the execution by the API server.

In this case, the collation server (5) does not have to include an algorithm. Thus, it is also possible not to disclose an algorithm when administrators of the collation server (5) and the API server (4) are different. Furthermore, the web server (2) only has to send the execution certification information (S12). Thus, a very small load is caused and at the same time there is no need to execute an algorithm related to the authorization or to store the above comparative list.

The second method in the API server (4) also may be carried out so that the execution certification information collation section (51) of the collation server (5) uses a value calculated based on a predetermined algorithm as the execution certification information to collate this information with the received execution certification information. In this case, no algorithm may be similarly provided and a comparative list of the dynamic common information and the execution certification information may be provided.

In the case of the third method of the API server (4), the execution certification information collation section (51) of the collation server (5) can store, in the storage section, the comparative list of the dynamic common information and the execution certification information similar to that included in the API server (4) to extract the dynamic common information during the extraction to collate these pieces of information. The collation server (5) also may include an algorithm to derive the execution certification information matching with the above comparative list. In this case, a value calculated by this algorithm using the dynamic common information at the time may be used as the execution certification information to collate this information with the received execution certification information.

In the case of the fourth method in the API server (4), the execution certification information collation section (51) of the collation server (5) may use a public key in the key exchange method to decrypt the received execution certification information. In this configuration, the decrypted dynamic common information is collated with the dynamic common information at the time to determine whether or not the former matches with the latter.

Alternatively, the execution certification information collation section (51) also may include a secret key shared with the API server (4). In this case, a predetermined algorithm is used to encrypt the dynamic common information at the time to collate the encrypted information with the received encrypted execution certification information to determine whether or not the former matches with the latter.

The collation result by the execution certification information collation section (51) may be stored in the execution certification information record (55) in the storage section so that the result can be referred to by a security administrator for example. Alternatively, the collation result also may be returned to the web server (2 (shown by the arrow S15 in FIG. 1).

EXAMPLE 3

Finally, the following section will describe a configuration wherein the execution certification information is generated using not only the dynamic common information but also additional information. In this configuration, the contents transmission section (21) of the web server (2) adds predetermined additional information to the contents and sends the contents with the added predetermined additional information.

The additional information is arbitrary data defined by the web server (2) and is character strings of dozens of digits for example. The additional information is received by the contents reception section (31) of the client (3). Thereafter, the additional information is sent when the API call section (32) calls the API server (4). Then, the execution certification information generation section (42) of the API server (4) generates the execution certification information based on the additional information together with the above-described dynamic common information.

The additional information may be one of parameters introduced in an algorithm to generate the execution certification information or also may be used as a parameter correlated with the dynamic common information and the execution certification information in the comparative list. In any case, the execution certification information based on both of the additional information and the dynamic common information is generated.

According to the configuration as described above, in comparison with Examples 1 and 2 that allow the execution certification information to use the dynamic common information as a parameter, the additional information defined by the web server can be used to generate such execution certification information that is different for each web server. This makes it impossible for another web server to acquire the execution certification information as a dummy.

The API execution detection section (23) of the web server (2) also may generate the execution certification information based on the additional information together with the dynamic common information to collate the execution certification information with the execution certification information received by the execution certification information reception section (22) of the web server (2). The execution certification information may be generated by a method generally similar to the above-described one except for that the additional information owned by itself is used as a parameter.

The additional information may be a random number generation section (not shown) included in the web server (2). Alternatively, the additional information also may be a unique identification value allocated in advance to the web server (2).

In relation to Example 2 shown above, the execution certification information collation section (51) of the collation server (5) also can generate the execution certification information based on the additional information received from the web server (2) together with the dynamic common information to collate the execution certification information with the execution certification information received from the web server (2).

EXAMPLE 4

In the present invention, the client (3) is preferably a general web browser. On the other hand, the client (3) does not have a function corresponding to the execution certification information transmission section (33). Thus, the API information sent form the contents transmission section (21) of the web server (2) preferably includes the link information to the web server (2).

The link information includes the URL of the web server (2) and a script to send the execution certification information when the contents reception section (31) of the client receives the API execution result and the execution certification information. As a result, even an existing web browser can function as the execution certification information transmission section (33) of the client (3) to send the execution certification information to the web server (2) based on the link information.

As described above, according to the network communication method and the network communication system of the present invention, the first server (2) can detect that the second server (4) is securely called via the client (3). This does not need a direct communication between the first server and the second server and can be realized by the communication used in existing contents distribution.

Furthermore, the use of the dynamic common information can prevent the result of calling the second server from being masqueraded, thus realizing appropriate detection. The use of the additional information also can further improve the accuracy.

DESCRIPTION OF REFERENCE NUMERALS

1 Network communication system
2 Web server
3 Client
4 API server
5 Collation server

What is claimed is:

1. A communication method in a network communication system composed of a first server, a second server, and a client connected via a network, comprising:
   a contents transmission step of allowing a contents transmission means of the first server to send to the client predetermined contents including at least API (Application Programming Interface) information for executing a predetermined application program stored in the second server;
   a contents reception step of allowing a contents reception means of the client to receive the contents;
   an API call step of allowing an API call means of the client to call the second server based on the API information;
   an application execution step of allowing an application execution means of the second server to execute, depending on the call, the application program stored in a storage means;
   an execution certification information generation step of allowing an execution certification information generation means of the second server to generate execution certification information based on dynamically-changing dynamic common information;
   an API response step of allowing an API response means of the second server to send the API execution result of the application execution means and the execution certification information to the client;
   an API execution result reception step for allowing the contents reception means of the client to receive the API execution result and the execution certification information;

an execution certification information transmission step of allowing the execution certification information transmission means of the client to send at least the execution certification information to the first server;

an execution certification information reception step of allowing the execution certification information reception means of the first server to receive at least the execution certification information from the client; and an API execution detection step of allowing the API execution detection means of the first server to detect, based on the execution certification information, the execution of the application program by the application execution means of the second server in association with the contents transmission by the contents transmission means.

2. The communication method according to claim 1, wherein: the dynamic common information is the time or a time factor changing with the time elapsed from a predetermined starting point.

3. The communication method according to claim 1, wherein: the dynamic common information is information received from an external device via the network or information calculated by a predetermined computation based on the information.

4. The communication method according to claim 1 wherein:

the API execution detection means of the first server generates execution certification information based on the dynamic common information to collate the execution certification information with the execution certification information received by the execution certification information reception means of the first server.

5. The communication method according to claim 1 wherein the method includes:

in a configuration in which the network communication system includes a third server connected to the above network communication system via a network, a step of allowing the API execution detection means of the first server to send to the third server the execution certification information received by the execution certification information reception means and a step of allowing the execution certification information collation means of the third server to generate execution certification information based on the dynamic common information to collate the execution certification information with the execution certification information received from the first server.

6. The communication method according to claim 1, wherein: the execution certification information generation means of the second server uses the above dynamic common information to generate execution certification information based on a predetermined formula provided in advance.

7. The communication method according to claim 1, wherein: the second server includes an execution certification information database in which the dynamic common information is associated in advance with the execution certification information and the execution certification information generation means of the second server refers to the execution certification information database based on the dynamic common information during the processing to generate the execution certification information.

8. The communication method according to claim 1, wherein:

the contents transmission means of the first server sends the contents further added with predetermined additional information, the API call means of the client sends the additional information when calling the second server, and the execution certification information generation means of the second server generates the execution certification information based on the additional information together with the dynamic common information.

9. The communication method according to claim 4, wherein:

the API execution detection means of the first server generates the execution certification information based on the additional information together with the dynamic common information to collate the execution certification information with the execution certification information received by the execution certification information reception means of the first server.

10. The communication method according to claim 5, wherein: the execution certification information collation means of the third server generates the execution certification information based on the additional information together with the dynamic common information to collate the execution certification information with the execution certification information received from the first server.

11. The communication method according to claim 8, wherein: the additional information may be a random value generated by a random number generation means provided in the first server.

12. The communication method according to claim 8, wherein: the additional information may be an identification value allocated in advance to the first server.

13. The communication method according to claim 1, wherein:

the API information sent from the contents transmission means of the first server includes link information to the first server, and the execution certification information transmission means of the client may send the execution certification information based on the link information.

14. A network communication system composed of a first server, a second server, and a client connected via a network, wherein:

the first server includes:

a contents transmitter to send predetermined contents to the client so that the predetermined contents include at least API (Application Programming Interface) information for executing a predetermined application program stored in the second server;

an execution certification information receiver to receive at least execution certification information from the client; and an API execution detector to detect, based on the execution certification information, the execution of the application program by an application executor of the second server while being associated with the contents transmission by the contents transmitter, and the client includes:

a contents receiver to receive contents from the first server and receive the API execution result and the execution certification information from the second server;

an API call section to call the second server based on the API information received from the first server; and an execution certification information transmitter to send to the first server at least the execution certification information received from the second server, and the second server includes:

an application executor to execute the application program stored in a storage means depending on the call;

an execution certification information generator to generate execution certification information based on dynamically-changing dynamic common information; and an API responder to send, to the client, the API execution result of the application executor and the execution certification information.

15. The network communication system according to claim 14, wherein: the dynamic common information is the time or a time factor changing with the time elapsed from a predetermined starting point.

16. The network communication system according to claim 14, wherein: the dynamic common information is information received from an external device via the network or information calculated by a predetermined computation based on the information.

17. The network communication system according to claim 14, wherein:
the API execution detector generates execution certification information based on the dynamic common information to collate the execution certification information with the execution certification information received by the execution certification information receiver.

18. The network communication system according to claim 14, wherein:
the network communication system includes a third server connected via a network and the API execution detector of the first server sends, to the third server, execution certification information received by the execution certification information receiver, and
the third server includes an execution certification information collation means of generating execution certification information based on the dynamic common information to collate the execution certification information with the execution certification information received from the first server.

19. The network communication system according to claim 14, wherein:
the execution certification information generator of the second server uses the dynamic common information to generate execution certification information based on a predetermined formula provided in advance.

20. The network communication system according to claim 14, wherein: the second server includes an execution certification information database in which the dynamic common information is associated in advance with the execution certification information and the execution certification information generator of the second server refers to the execution certification information database based on the dynamic common information during the processing to generate the execution certification information.

21. The network communication system according to claim 14, wherein:
the contents transmitter sends the contents further added with predetermined additional information,
the API call section of the client sends the additional information when calling the second server, and
the execution certification information generator of the second server generates the execution certification information based on the additional information together with the dynamic common information.

22. The network communication system according to claim 17, wherein:
the API execution detector of the first server generates the execution certification information based on the additional information together with the dynamic common information to collate the execution certification information with the execution certification information received by the execution certification information receiver.

23. The network communication system according to claim 18, wherein: the execution certification information collation means of the third server generates the execution certification information based on the additional information together with the dynamic common information to collate the execution certification information with the execution certification information received from the first server.

24. The network communication system according to claim 21, wherein: the additional information is a random value generated by a random number generation means provided in the first server.

25. The network communication system according to claim 19, wherein: the additional information is an identification value allocated in advance to the first server.

26. The network communication system according to claim 14, wherein:
the API information sent from the contents transmitter includes link information to the first server, and
the execution certification information transmitter of the client sends the execution certification information based on the link information.

* * * * *